Patented Sept. 13, 1938

2,130,326

UNITED STATES PATENT OFFICE 2,130,326

METHOD OF FORMING AN EMULSIFYING AGENT

Robert R. Thurston, Chappaqua, N. Y., assignor to The Texas Company, New York, N. Y., a corporation of Delaware No Drawing. Application May 11, 1933, Serial No. 670,515. Renewed February 5, 1938

4 Claims. (Cl. 260—505)

This invention relates to a method of forming an emulsifying agent useful for the production of stable dispersions of hydrocarbon materials, such as paraffin or asphalt, wherein dispersed particles of these materials are supported in an aqueous medium and stabilized to prevent coagulation or coalescence of the dispersed particles.

I have discovered that hydrocarbon oils, particularly heavy distillate lubricating oil stock, when treated with strong sulphuric acid in the presence of a low boiling aromatic compound of the type of benzol produces a material having a high saponification value and which on being saponified by reaction with an alkali is particularly effective for stabilizing dispersions of heat liquefied hydrocarbon materials, such as asphalt or paraffin.

Various types of hydrocarbon oils and residua have been treated in accordance with the present invention and their effectiveness in stabilizing dispersions determined, the treated materials including various types of straight distillate oil of both low and high viscosity, residua from the distillation of crude oil and various extracts, particularly furfural and $SO_2$ extracts of lubricating oil.

The following is one preferred example of carrying out the invention: To 1,000 gr. of a heavy lubricating oil of the straight distillate type, having a viscosity of 120 (Saybolt Universal at 210° F.), there was added 400 gr. of commercial benzol and 1,000 gr. 98% commercial sulphuric acid. The acid was added with rapid stirring and the temperature thereafter maintained at from 150° to 170° F. for approximately four hours. Thereafter 500 cc. of water were added and the stirring continued for another four hours at substantially the same temperature. The reacted materials were then allowed to stand quietly at from 95° to 105° F. for from twelve to sixteen hours to permit settlement and separation into layers. This procedure normally gave three layers, a lower acid water layer, an intermediate sludge layer and an upper sulphonated oil layer.

The intermediate sludge layer is the most effective, after treatment, as a stabilizer for dispersions, although the upper sulphonated oil layer can be used. A sludge layer produced as above from a heavy lubricating oil distillate with 20% benzol tested as follows,—neutralization number—185 and saponification value—226. The sulphonated oil product (the top layer) tested: neutralization number—7.84 and saponification value—7.8. The lower water acid layer can be treated for the recovery of the acid as it is without value in the formation of asphalt or paraffin dispersions.

In preparing the above sludge layer for use as a stabilizing agent for dispersions it was reacted with a sufficient quantity of an alkali, such as caustic soda, for completely neutralizing the acid bodies present, the neutralization being continued at lower temperatures until a brown color was obtained. Thereafter the mixture was heated for approximately two hours in a steam bath at 150° to 200° F. to complete the neutralization. The sulphonated materials neutralized with caustic, as described above, were used as a sodium salt added to the water into which the asphalt or other material was to be dispersed. 3% of the neutralized sludge, calculated before neutralization and on the basis of the dispersed solids, that is, the melt, was found to be the most effective and economical quantity to use. Decreasing the stabilizing material to approximately 2% caused a corresponding decrease in the stability of the dispersion and when used up to about 5% of the melt there resulted only a slight increase in the stability or other desirable features of the dispersion. 10% of the neutralized sulphonated compound is considered the limit necessary to be used for stabilizing any usual dispersion of a heat liquefied hydrocarbon material. It has been found to improve the character of the dispersion if a small quantity of caustic soda is also added to the water so that the pH of the water prior to the introduction of the asphalt or other melt, but after the addition of the neutralized sulphonated compound, is approximately 10 to 12.

The asphalt or paraffin may be dispersed in the usual manner and with any usual apparatus which serves to thoroughly agitate the heat liquefied material to be dispersed as it is added to or mixed with the alkaline aqueous solution containing the stabilizing agent.

Dispersions of thermoplastic hydrocarbon materials formed in accordance with the above disclosure were found to be very stable and even after being repeatedly frozen they came back to substantially their original state of fluidity on being thawed and readily coated stone. The more satisfactory dispersions for use contained from 32% to 45% of water, although a smaller or larger proportion may be used with a corresponding decrease or increase in the fluidity of the dispersion. The demulsibilities (i. e., percent. of the asphalt thrown out) of the dispersions disclosed herein were particularly low, many of them running 1% or less when 100 gr. of the emulsion are treated with 50 cc. of N/10 CaCl₂.

The sludge layer may be utilized by adding the same quantity of the sludge directly to the melt, sufficient alkali being added to the water to neutralize the acid content of the sludge and leave the resulting dispersion with a pH of approximately 10 to 12. Dispersions formed in this manner were in general slightly less stable than those produced by first neutralizing the sludge and then adding the neutralized compound to the water either before or during the formation of the dispersion.

Emulsions made utilizing the upper oil soluble layer were not as satisfactory as those formed from the intermediate sludge layer. These dispersions were more satisfactory, however, when the upper oil layer was added to the asphalt and neutralized in situ as the asphalt was dispersed in the alkaline water solution. From 2% to 5% of the sulphonated oil layer, based on the melt, has been found to be approximately the correct amount, whether added to the asphalt and neutralized as the asphalt is dispersed, or used as the sodium salt of the oil layer, added to the water before dispersion.

Various types of distillate oils, ranging from gas oil to high viscosity lubricating oils, were treated as above. Lubricating distillates of low viscosity gave lower yields of sludge products but, in general, the dispersions produced from the sludge layer of these distillates, treated as above, were the most satisfactory.

Stabilizing agents were also made by taking extracts obtained from lubricating oils, after treatment with furfural and also with SO₂, and treating them with sulphuric acid in the presence of benzol or other aromatic compound as described above. When an extract was treated, only two layers of the materials formed on settling, a lower acid water layer and an upper oil layer. From 2% to 5% of the treated aromatic-sulphonated oil layer were added to the asphalt phase before dispersion in an alkaline water solution. These dispersions, particularly those containing 3% or more of the stabilizing material were very satisfactory in that they coated stone and did not break on freezing.

The exact chemical role of the aromatic, such as benzol, in the sulphonation reaction utilized herein is not clear. However, the physical nature of the sludge layer is very markedly influenced by the presence of the aromatic. A complicated molecule which may be termed a petroleum hydrocarbon-benzene sulphonic acid is apparently produced although no actual chemical structure has been determined. It has been shown, however, that the aromatic material actually enters into chemical combination with the hydrocarbon by reason of the fact that distillation of the product made with benzol does not liberate any but a small portion of the benzol used. Without benzol or its equivalent the sludge product is a solid carbonaceous-appearing mass which is difficult to handle. It retains a considerable proportion of the acid water. With even 10% benzol, based on the quantity of the distillate, the sludge layer is extremely viscous. With 20% benzol the sludge is fairly fluid at room temperature and this fluidity is not materially increased with the use of up to 40% benzol.

Of the various aromatics which have been used in carrying out the invention, benzol is considered to be the most effective although other low boiling aromatic compounds, such as toluol, diphenyl, etc., may be used.

While specific examples for carrying out the invention have been herein described, as required by the statutes, it is to be understood that variations of the invention are contemplated and only such limitations are to be imposed as are defined in the appended claims.

I claim:

1. The method of forming an emulsifying agent which comprises mixing 90–60% of a petroleum distillate lubricating oil and 10–40% of an aromatic hydrocarbon selected from the group consisting of benzol, toluol and diphenyl, heating the mixture with a sulfonating agent to form petroleum hydrocarbon-aromatic sulfonic acids, adding water to the resultant material and allowing the material to stratify, separating the intermediate sludge-like layer therefrom, and adding an excess of caustic soda to the separated sludge-like layer to completely neutralize said layer and to form sodium salts of the petroleum hydrocarbon-aromatic sulfonic acids.

2. The method of forming an emulsifying agent which comprises mixing 90–60% of a petroleum fraction selected from the group consisting of petroleum distillate lubricating oil and solvent extracts of petroleum lubricating oil, with 10–40% of an aromatic hydrocarbon selected from the group consisting of benzol, toluol and diphenyl, heating the mixture with a sulfonating agent to form petroleum hydrocarbon-aromatic sulfonic acids, adding water to the resultant sulfonated material and allowing the mixture to stratify, separating a sulfonated oily layer from the acid layer, and neutralizing the separated oily layer with an excess of an alkali metal base to form alkali metal salts of the petroleum hydrocarbon-aromatic sulfonic acids.

3. The method of forming an emulsifying agent which comprises mixing about 80% of a petroleum lubricating oil extract by a solvent selected from the group consisting of furfural and liquid sulfur dioxide, with about 20% of benzol, heating the mixture with a sulfonating agent to form petroleum hydrocarbon-aromatic sulfonic acids, adding water to the resultant sulfonated material and allowing the material to stratify, separating an upper sulfonated oil layer from a lower acid layer, and neutralizing the separated oil layer with an excess of caustic soda to form sodium salts of the petroleum hydrocarbon-aromatic sulfonic acids.

4. The method of forming an emulsifying agent which comprises mixing about 80% of a petroleum distillate lubricating oil with about 20% of benzol, heating the mixture with a sulfonating agent to form petroleum hydrocarbon-aromatic sulfonic acids, adding water to the resultant sulfonated material, and allowing the material to stratify, separating a sulfonated oily layer from the acid layer, and neutralizing the separated oily layer with an excess of caustic soda to form sodium salts of the petroleum hydrocarbon-aromatic sulfonic acids.

ROBERT R. THURSTON.